Nov. 24, 1936.  E. RIEMENSCHNEIDER  2,061,671
APPARATUS FOR WELDING
Filed June 15, 1931  10 Sheets-Sheet 4
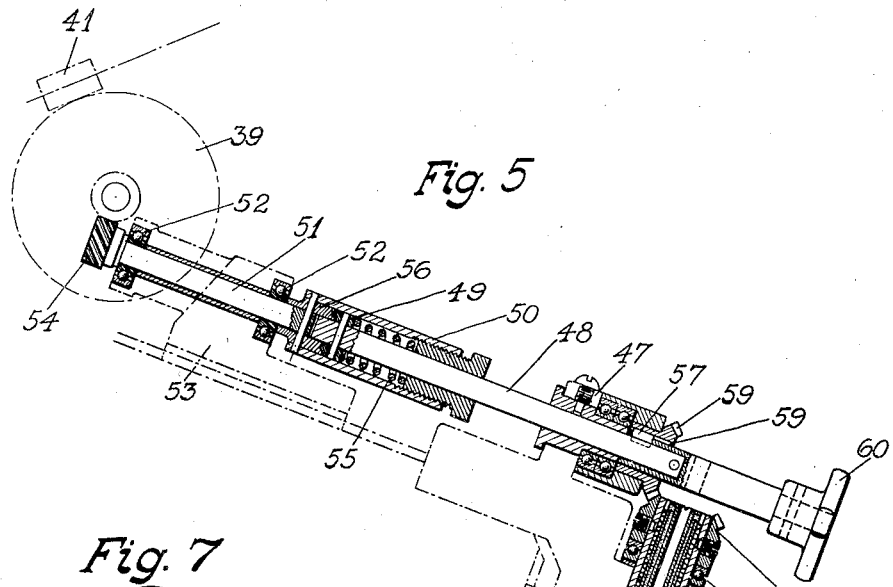
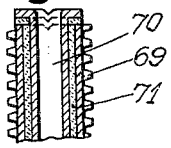
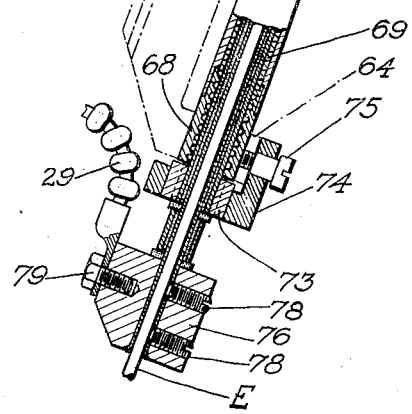
INVENTOR
ERNEST RIEMENSCHNEIDER.
BY Louis W Kelmuth
ATTORNEY Nov. 24, 1936.  E. RIEMENSCHNEIDER  2,061,671
APPARATUS FOR WELDING
Filed June 15, 1931  10 Sheets-Sheet 5
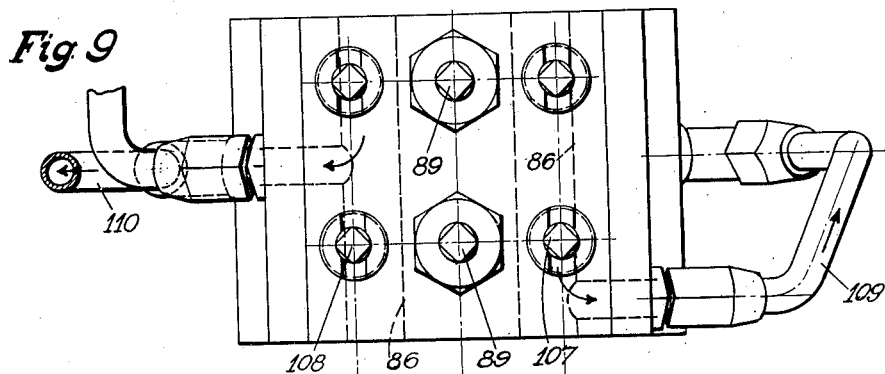
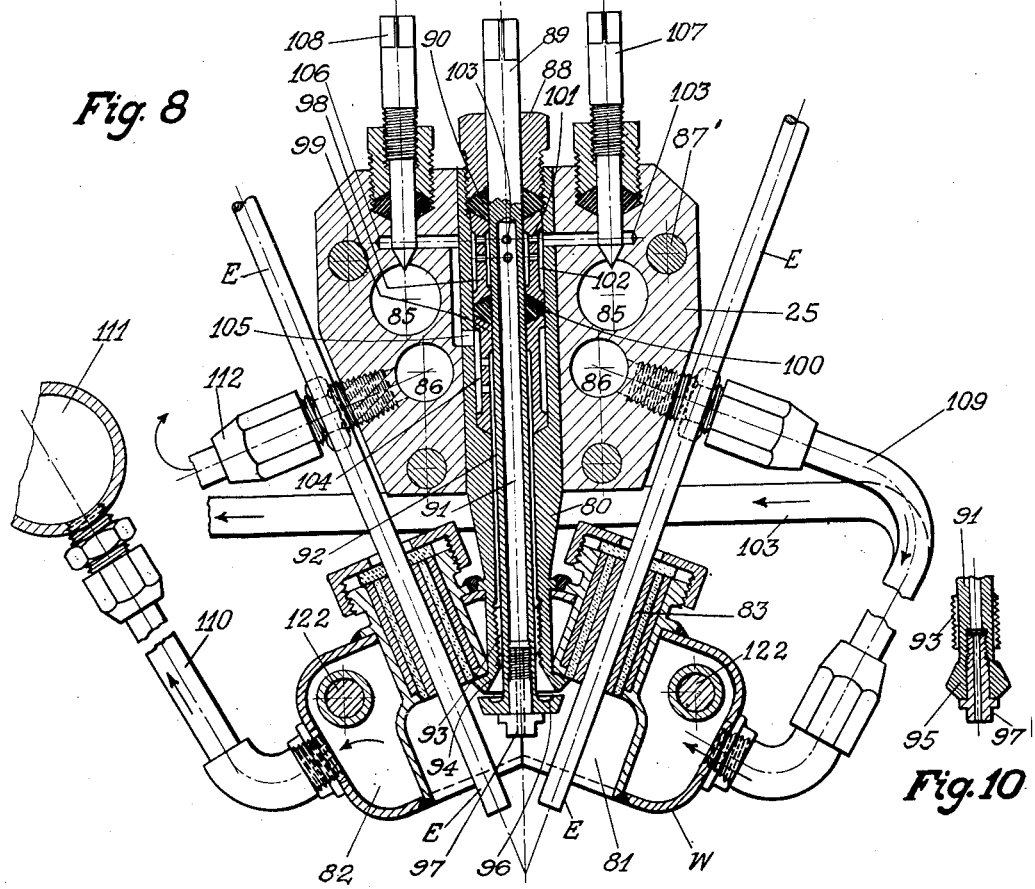
INVENTOR
ERNEST RIEMENSCHNEIDER
BY
ATTORNEY

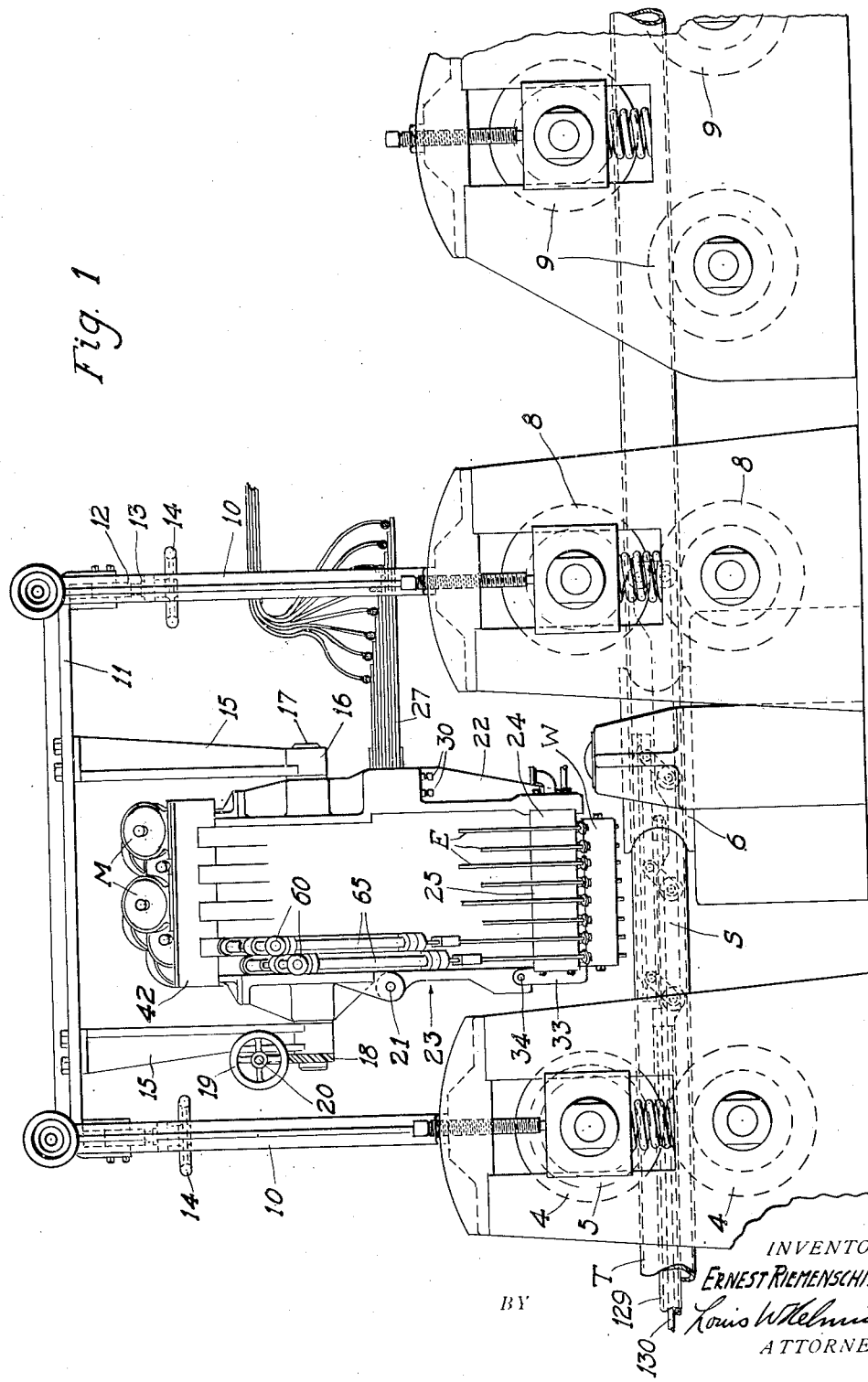

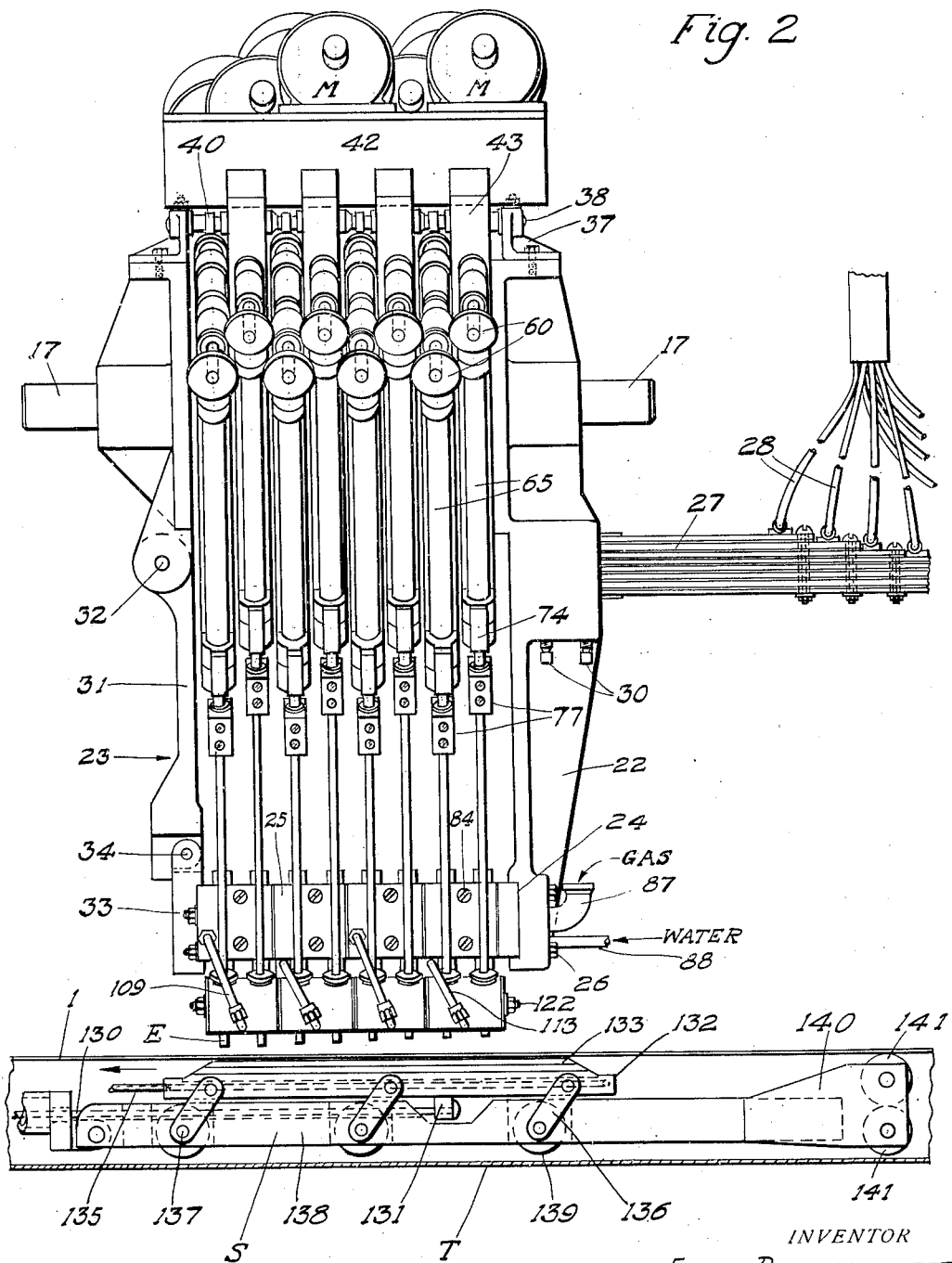

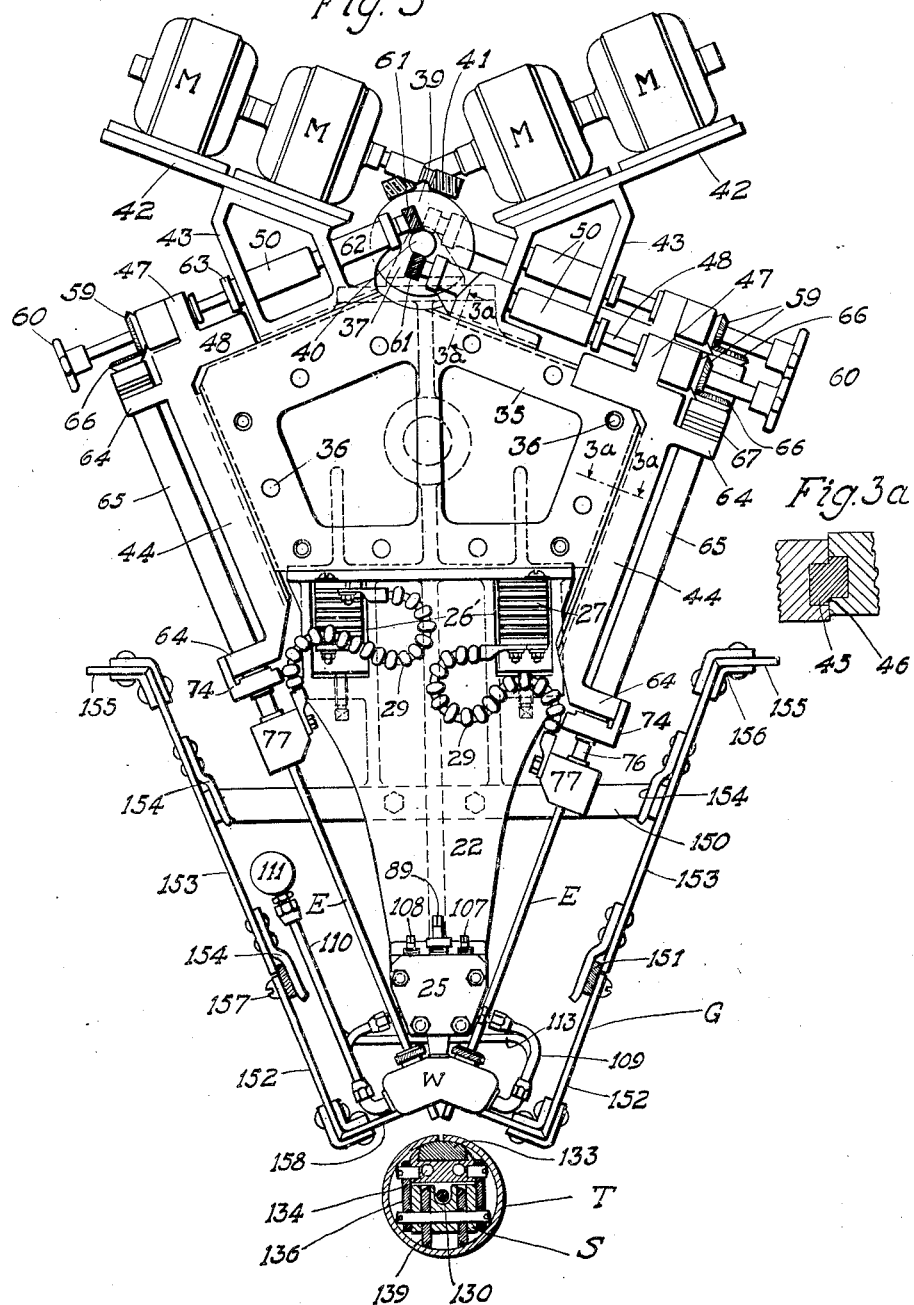

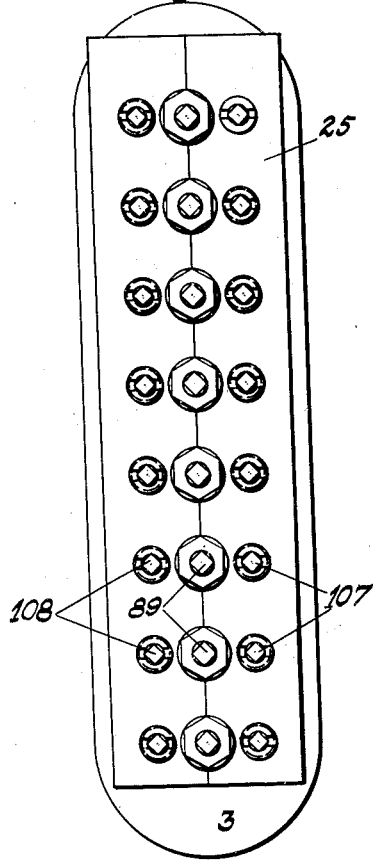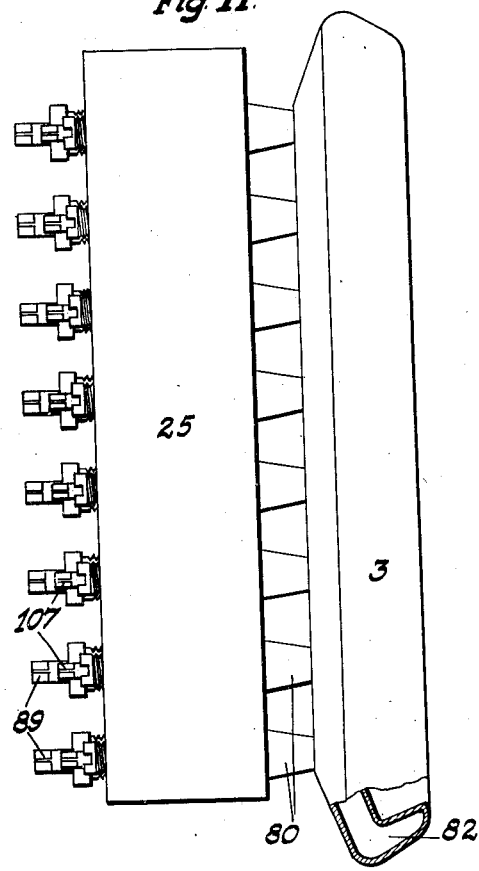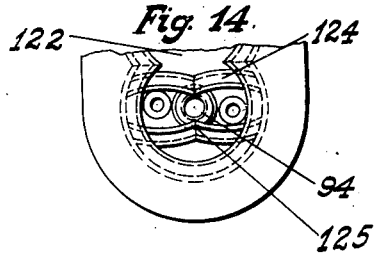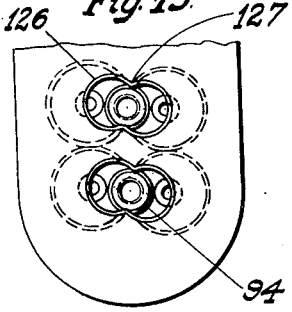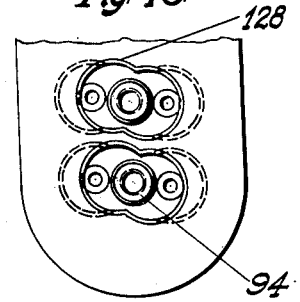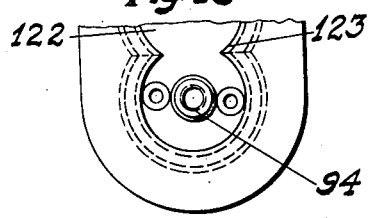

Nov. 24, 1936.   E. RIEMENSCHNEIDER   2,061,671
APPARATUS FOR WELDING
Filed June 15, 1931   10 Sheets-Sheet 7
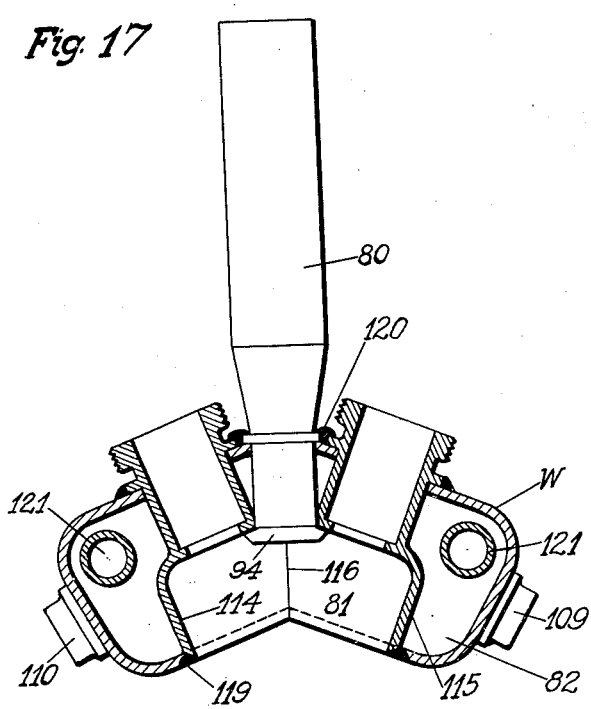
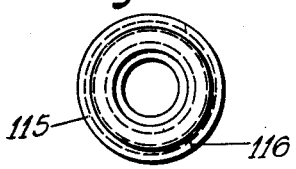
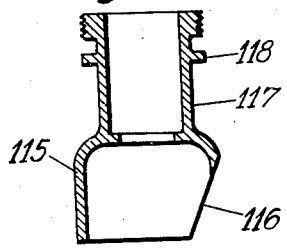
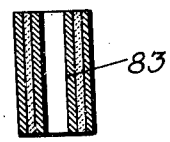
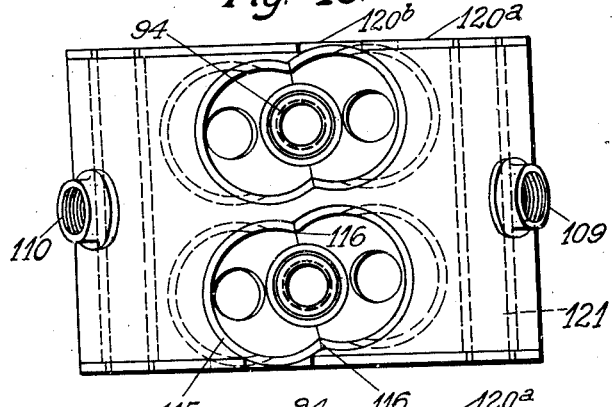
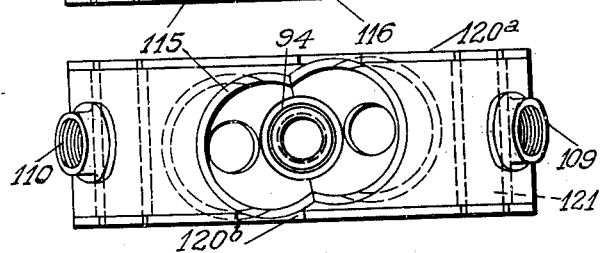
INVENTOR
ERNEST RIEMENSCHNEIDER
BY
Louis W Helmuth
ATTORNEY Nov. 24, 1936.  E. RIEMENSCHNEIDER  2,061,671
APPARATUS FOR WELDING
Filed June 15, 1931   10 Sheets-Sheet 8
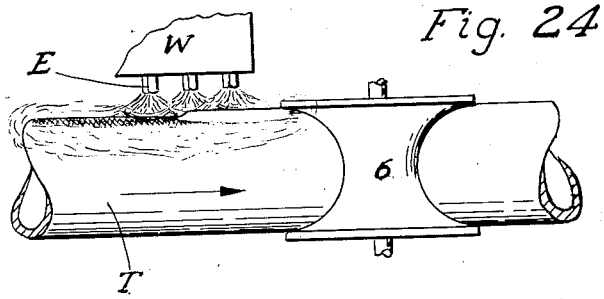
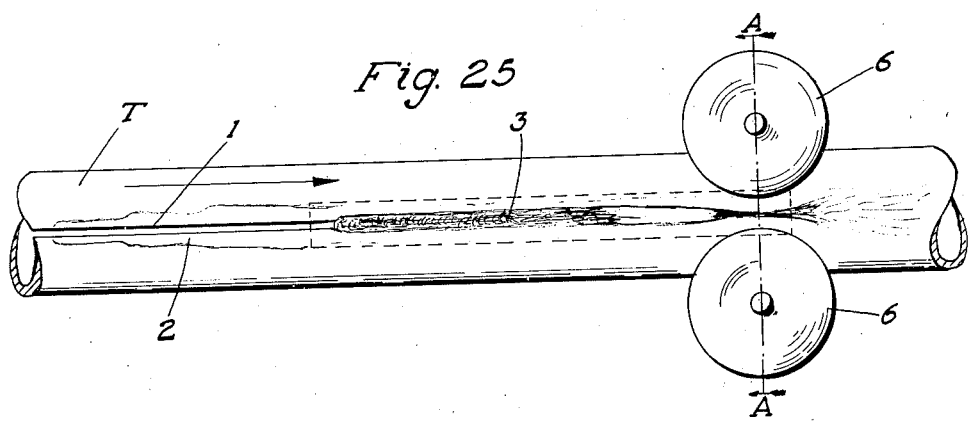
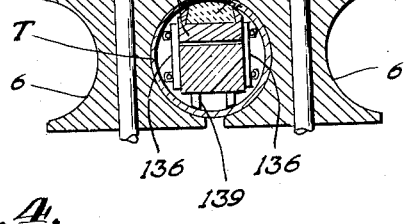
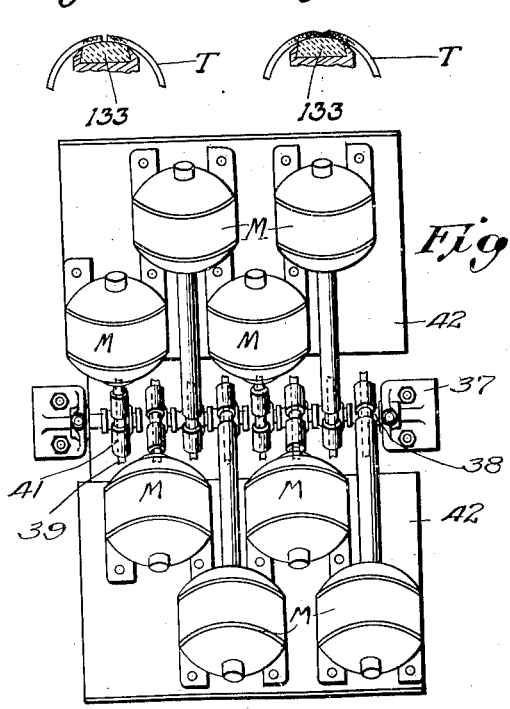
INVENTOR
ERNEST RIEMENSCHNEIDER
BY
ATTORNEY Nov. 24, 1936.   E. RIEMENSCHNEIDER   2,061,671
APPARATUS FOR WELDING
Filed June 15, 1931   10 Sheets-Sheet 9
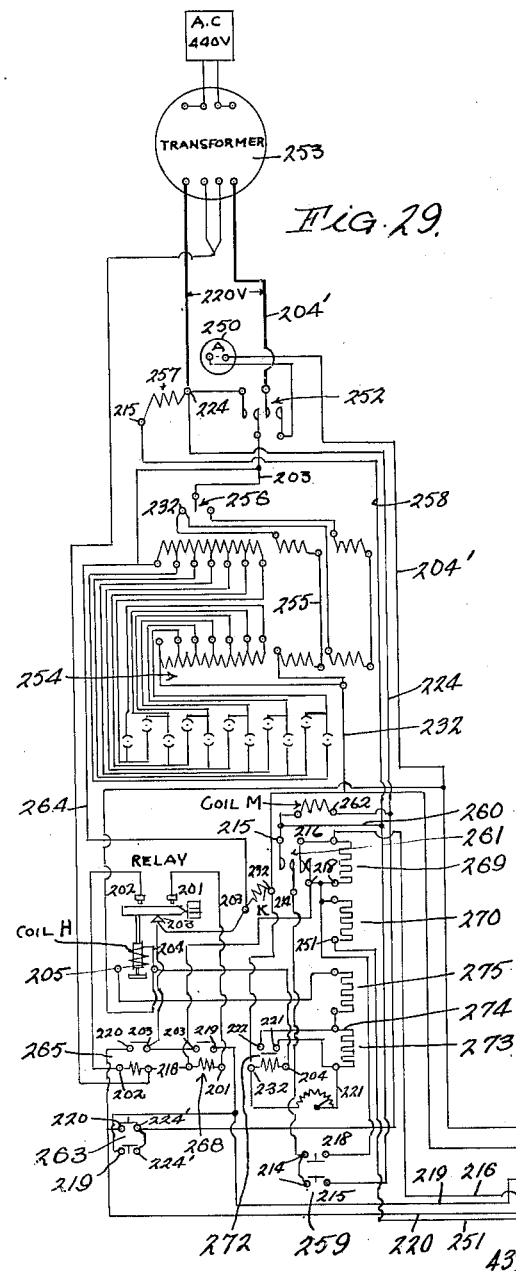
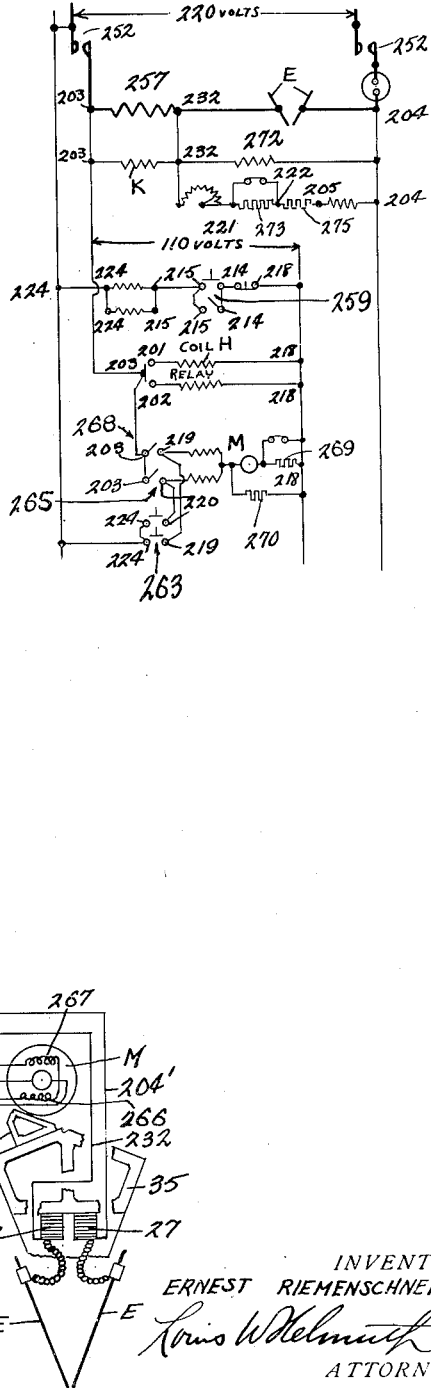
INVENTOR
ERNEST RIEMENSCHNEIDER
ATTORNEY Nov. 24, 1936. E. RIEMENSCHNEIDER 2,061,671
APPARATUS FOR WELDING
Filed June 15, 1931 10 Sheets-Sheet 10

INVENTOR
ERNEST RIEMENSCHNEIDER.
BY
ATTORNEY

Patented Nov. 24, 1936

2,061,671

UNITED STATES PATENT OFFICE 2,061,671

APPARATUS FOR WELDING

Ernest Riemenschneider, Cleveland, Ohio, assignor to The Midland Steel Products Company, Cleveland, Ohio, a corporation of Ohio Application June 15, 1931, Serial No. 544,456

32 Claims. (Cl. 219—8)

This invention relates to welding processes and apparatus of the type disclosed in my co-pending applications Serial Numbers 473,484, filed August 6th, 1930 and 475,948, filed August 18th, 1930, for automatic continuous welding and has for its primary object to provide for increased speed of production of welds, possessing unusual ductility and tensile strength.

Another object of the invention is to provide welding apparatus with a plurality of heat producing means so closely associated as to constitute, in effect, an elongated heating zone of such length as to rapidly bring the edges of the two bodies being united to a molten or melted state as distinguished from the plasticity state in ordinary fusion welding, and without causing interference of the thus closely arranged heat producing means.

Another object of the invention is to provide welding apparatus of the above character in which preferably atomic hydrogen arcs constitute the several heating means for supplying each of the arcs or heating means with gas or hydrogen from a single source of supply; the flow of gas to each arc being individually controlled to create the desired conditions in the maintenance of a non-oxidizing atmosphere to preclude oxidation of the weld.

Another object of the invention is to provide a process and apparatus which will produce a superior weld or union between the two bodies without the necessity of any prior preparation of the bodies or the edges thereof, even in the alloy steels such as chrome nickel steel, vanadium, and the like.

A further object of the invention is to provide a multiple arc machine in which the arcs are so arranged as to produce an elongated continuous heating zone forming a substantially elongated electric arc in which there is no electrical interference between the individual arcs, whereby the two bodies to be welded can be quickly worked up to an actual melting point so that the bodies can be welded together as fast as they are fed into the welding apparatus. The electrodes producing the arcs are arranged so that the arcs will be stabilized and maintained parallel to the seam to play directly down into the open seam to actually melt down the stock edges for its full thickness or to such a degree in thicker stock as will produce a weld of the necessary strength.

Another important object of the invention is to provide a multiple arc apparatus in which the arc producing means may be adjusted vertically or laterally as a unit, or the individual arc producing means adjusted vertically whereby their elevation may be progressively varied throughout the length of the seam, or those disposed farthest from the point of entry of the work into the apparatus, adjusted a sufficient distance from the work to permit of any gases remaining in the molten portions to act and escape from the weld, thereby eliminating porosity.

A further important object of the invention is to provide a common source of hydrogen for all of the arcs and individual control means for each arc for supplying high and low pressure hydrogen to each arc in controlled amounts.

A still further object of the invention is to provide an electrode chamber and gas feeding arrangement which will insure the uniform flow and distribution of the gas around the electrodes and arc formed thereby in order to create, in effect, a non-oxidizing envelope about the arc and edges to be united, whereby atmospheric air is completely excluded from the welding zone.

A further object of the invention is to provide means for cooling the electrode or arc chamber and the control body located proximate thereto, as well as to provide heat insulating means which protect the apparatus from the intense heat developed by the plural arcs. The invention also provides for a sectional unit arrangement of the arc producing means whereby one or any number of arcs may be employed in the apparatus.

A further object of the invention is to provide accurate automatic mechanism for feeding or adjusting the electrodes of each individual arc and to provide an arrangement whereby such mechanism can be properly arranged in the necessarily restricted space to effect the close disposition of the plurality of arc creating means in order to achieve the necessary relationship of arcs to constitute the elongated continuous heating or welding zone. The construction and arrangement of this mechanism makes it possible to employ any number of arc creating mechanisms found necessary or desirable for any particular class of work.

A still further object of the invention is to provide means for controlling any one or more of the arc mechanisms or all of them simultaneously.

Still another object of the invention resides in the provision of an improved shoe for supporting the under side of the bodies to be welded and particularly at the point where the portions of said bodies are reduced to a molten state, such shoe also having means cooperating with upsetting rolls and smoothing rolls to complete the weld after passing from beneath the welding head.

Other objects and advantages of the invention will become apparent during the course of the following description.

In the accompanying drawings forming a part of the descriptive matter and wherein like numerals are employed to designate like parts throughout the several views:

Figure 1 is a side elevation of the welding apparatus.

Figure 2 is an enlarged side elevation of the welding head showing tubing in position therebeneath to be welded, said tubing being illustrated in section to illustrate the disposition of the supporting medium with respect to the welding head.

Figure 3 is an end elevation of the same. Figure 3a is a transverse section taken on the line 3a—3a of Figure 3, showing an interchangeable key for use in connection with different size electrodes.

Figure 4 is a top plan of the welding head shown in Figures 2 and 3.

Figure 5 is an enlarged vertical section through one of the electrode holders and the adjusting mechanism therefor.

Figure 6 is an enlarged fragmentary section of the upper portion of the electrode holder.

Figure 7 is a top plan of the same.

Figure 8 is an enlarged, transverse vertical section through one of the units of the welding head and control body.

Figure 9 is a top plan of one of the control body units and welding head units.

Figure 10 is a longitudinal section of the lower end of one form of the combined high and low pressure jet.

Figure 11 is a side elevation of a unitary structure for the welding head and control body.

Figure 12 is a top plan of the same.

Figure 13 is a bottom plan of one end of one form of welding head or electrode chamber.

Figure 14 is a similar view of a modified form of electrode chamber.

Figure 15 is a further modified form of such chamber.

Figure 16 is still a further modified form of electrode chamber.

Figure 17 is an enlarged vertical and transverse section of the form of electrode chamber shown in Figure 8.

Figure 18 is a bottom plan of the same, illustrating the arrangement for a unit designed to accommodate two pairs of electrodes.

Figure 19 is a corresponding view of a unit designed for only one pair of electrodes.

Figure 20 is a vertical section of one of the electrode cups or chambers constituting one half of a welding chamber.

Figure 21 is a top plan of the same.

Figure 22 is a vertical section through the bushing adapted to be received in the upper end of the cup of Figure 20.

Figure 23 is a top plan of the bushing.

Figure 24 is a side elevation of the tubing illustrated indicating more or less diagrammatically the last stage of the welding zone.

Figure 25 is a top plan of the tubing in the welding zone.

Figure 26 is a fragmentary transverse section of the same showing the initial effect of the initial arc or arcs upon the work.

Figure 27 is a similar view illustrating the subsequent effect of the arcs in reducing the edges of the seam to be closed to a molten state.

Figure 28 is a transverse section taken on line A—A of Figure 25.

Figure 29 shows the wiring diagram for the apparatus.

Figure 30 is a wiring diagram of a part of the wiring.

Figure 31:
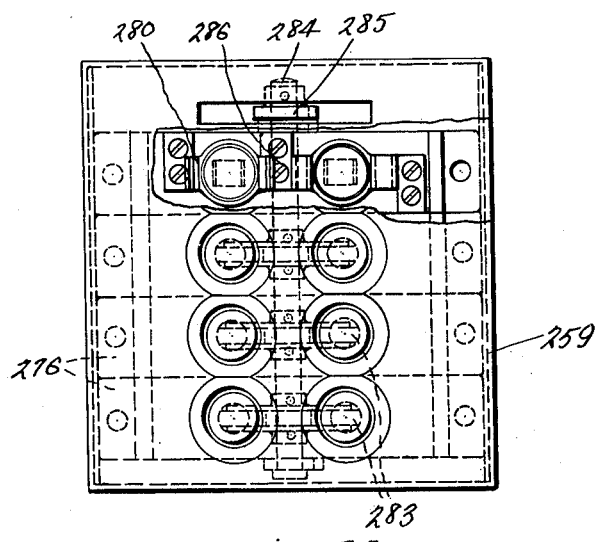
Figure 31 is a top plan of the multiple switch employed in this apparatus.

While the invention has been illustrated in the present instance for the continuous welding of tubing, it is to be distinctly understood that the invention is not limited to this class of work but is capable of general application in welding flat strips, circumferential welds, or any other type or species, it only being necessary to change the type of work feeding means for properly directing the work beneath the welding head or zone. The herein apparatus is especially designed for receiving tubing direct from the tube forming apparatus as disclosed in my co-pending application Serial #474,484, or for receiving hot strip or tubing directly from the mill without the necessity of treating the tubing or the edges of the open seam in any manner whatsoever excepting possibly to shear off any uneven edges or to produce a strip of proper width to produce tubing of the desired size. It is possible to weld tubing without any special prior preparation of the edges or otherwise with this apparatus, at increased speeds of 60 feet or more per minute by reason of the multiple arc welding head reducing the edges of the open seam to a molten state for a substantial distance to either side of the open seam. Increased speed of production can be obtained by feeding the metal to be welded into the welding apparatus in a heated condition; such heated condition being obtained either by a separate heating means or by utilizing the heat remaining in the strip which comes from the mill. However, it is not at all necessary to use hot stock in this welding apparatus, since the multiple arc welding head is capable of raising the temperature of cold stock so that the edges thereof are reduced to a molten state.

While I have disclosed the present invention as employing atomic hydrogen arcs, it is to be understood, as explained in my co-pending applications, that the invention is not limited to this particular type of arc producing apparatus or to any particular type of welding apparatus, it only being essential that heating elements are employed which are capable, in multiple or otherwise, of reducing the edges of the seam to a molten state at a sufficiently rapid rate for commercial production.

As explained in my co-pending applications, the tubing T, with an open seam 1 uppermost, is moved at a rapid rate beneath a series of heating units or electric arcs to progressively raise the temperature of the edges of the open seam as indicated in Fig. 25, by the numeral 2, until these edges are reduced to a molten state throughout the full thickness of the material to constitute an elongated narrow molten pool of metal 3, in the seam cleft of the tube. This molten pool is supported upon the supporting shoe or device S, within the tubing whereby the metal from the two edges of the seam flows together, intermingling and forming a homogeneous mass to thereby form the tubing into practically seamless tubing as will be more particularly described hereinafter.

Referring now to the apparatus in detail, the numeral 4, designates a pair of superposed driven feed rolls having concaved peripheries to engage the tubing and feed it beneath the welding head indicated in its entirety by the letter W. The upper roll is provided with a circumferential radial rib 5, at the bottom of its concave periphery to enter the open seam 1, of the tubing as it passes between the feeding rolls. At the far end of the welding head W, is provided a pair of upsetting rolls 6, mounted on vertical axes, their purpose being to gradually compress the tubing to cause the molten metal in the pool 3, to bulge at the seam as at 7 in Fig. 28 so as to completely fill the seam with molten metal. Beyond the upsetting rolls are provided a pair of smoothing and feeding rolls 8, the purpose of the upper of these rolls being to compress the plastic metal at the seam and to make it conform to the true circular configuration of the tubing. Beyond the smoothing rolls are a series of straightening rolls 9, arranged in staggered relationship above and below the tubing, and, of course, are concaved rollers to straighten the tubing and retard any tendency for it to warp under the gradual lowering of its temperature. From this point on, the tubing is passed to a flying cutter such as disclosed in my co-pending application where the tubing is cut into appropriate lengths.

The support of the welding apparatus is formed by suitable uprights 10, rising from the supports of the rolls 4 and 8, and formed with guide means for the vertical adjustment of a transverse supporting beam 11, having abutments 12, for engaging the jack screws 13, equipped with suitable hand wheels 14. By rotating the hand wheels 14, the elevation of the transverse supporting beam 11, can be varied in order to vertically adjust the welding head W, with respect to the tubing therebeneath. Depending from the support 11, are a pair of hangers 15, having their lower ends formed with bearings 16, for rotatively supporting a pair of trunnions 17, one of which is equipped with a worm wheel 18, keyed thereto for turning the same, when a hand wheel 19, secured to a shaft 20, mounted upon one of the hangers 15, is turned thereby rotating a worm meshing with the worm wheel 18. These trunnions 17, are keyed to a supporting frame 21, for the welding head whereby upon turning of the hand wheel 19, the welding head W can be adjusted laterally of the tubing. This supporting frame 21, is composed primarily of a pair of end frames 22 and 23, the former having a seat 24, for one end of a control body 25, which in turn supports the welding head W. This end of the control body is bolted by means of bolts 26, to the seat 24, so as to be supported thereby without assistance of the support 23 when required, as will be hereinafter explained. The support 22, is provided with a pair of openings 26', for the passage therethrough of laminated conductors, separated each from the other by suitable insulation, One of these conductors is provided with a terminal at each end for the connection of a looped conductor 28, and an insulated looped conductor 29, connected to the other end of each conductor. These conductors are looped or provided with sufficient slack to enable adjustments of the support 21, for the welding head as well as the adjustment of the electrodes to be presently described. These laminated sets of conductors 27, are insulated from the support 22 and are securely clamped thereto by means of the set screws 30.

As shown in Figs. 1 and 2, the support 23, is an articulated structure composed of a main section 31, hingedly connected as at 32, with a removable pin to the upper portion of the support, and a lower clamping portion 33 hingedly connected by a removable pin 34, to the lower end of the articulated section 31. The pin 34 is removable to permit independent articulation of section 31 whereby access to the valves of the control body may be had. Section 33 is equipped with a seat for the reception of one end of the control body 25, its opposite end being supported on the seat 24 of the co-acting support 22. This section 33 may be swung outwardly from the control body independently of the section 31 when it is desired to remove the control body from the supporting structure or may be left attached to that body.

A supporting frame for electrode holders and electrode adjusting mechanism is secured to the supports 22 and 23, and preferably comprises a plurality of individual supporting frames 22 and 23, by means of tie rods or bolts 36, extending through the entire set of frames and into the end frames. Each of the frames 35, is provided on one face at approximately the four corners thereof with tubular dowels as shown, for assisting in aligning the different frames when assembling. These end frames 22 and 23 have secured to their upper ends, bearings 37 for a shaft 38, extending above the whole series of frames 35. There are eight of these frames 35, illustrated herein because the apparatus is herein illustrated with a series of eight heating units or arc producing means; there being provided one frame for each arc producing means. For each frame 35 or arc producing means, there is mounted on the shaft 38, a worm gear unit comprising a relatively large worm wheel 39, and a relatively small worm wheel 40, each unit being individually rotatable upon the shaft for the individual control of the pair of electrodes associated with that head. The larger worm wheel 39, meshes with a worm 41, carried by the armature shaft of an electric reversing motor M, which drives its individual worm unit above mentioned. As more clearly shown in Figure 4, these motors are arranged in staggered relationship on opposite sides of the shaft 38, and in more or less nested relationship whereby they may be arranged in a restricted area essential for the close relationship necessary for the various heating units or arcs to be more fully described hereinafter. Thus it will be seen that the armature shafts of alternate motors are extended between the motor housings of adjacent motors to assist in providing for the necessary compact relationship. The motors on each side of the shaft 38, are mounted on an inclined platform 42, supported by brackets 43, secured to the tops of the frames 35. Preferably the brackets 43 are provided with keyways slidable upon the inclined keys on the tops of the frames 35, and may be secured in the desired relationship by any suitable means.

As will be appreciated from Figs. 3 and 5, removable electrode holder bearings 44, of inverted L shaped configuration are supported by keys 45, along the downwardly and inwardly inclined sides of each frame 35, the angularly disposed upper portion of each bracket overlapping the top of its individual frame 35, as shown. These keys 45, may be of plain rectangular cross section or may be of the cross section shown in Fig. 3a. In the latter event interchangeable keys 45, are provided having shoulders 46, of varying depths thereby with the use of different size keys, the holder bearing brackets may be adjusted to accommodate electrodes of different sizes. The upper angular ends of the brackets 44, which overlap the frames 35, are each equipped with a bearing portion 47, for the support of one end of a shaft 48, the other end of which is keyed to a clutch element 49, rotatably mounted on a clutch sleeve 50, secured to one end of shaft 51. This shaft 51, is mounted in anti-friction bearings 52, carried by a bearing 53, splined to the top of a frame 35. A worm 54, is keyed to the shaft 51 for mesh with the small worm wheel 40, carried by the worm unit at the center of the machine. Surrounding the shaft 48 within the clutch housing 50, is a coil spring 55, which normally tends to hold the clutch element 49, engaged with the female clutch element 56, to impart the drive from the shaft 51 to the shaft 48. The outer end of the shaft 48 is provided with a key 57, operating in a keyway 58, of a bevel gear 59, in order to rotate the latter with the shaft upon rotary movement of the latter and to permit longitudinal sliding movement of the shaft 48, within the gear when the handle 60, of this shaft is pulled outwardly thereby compressing the spring 55, and disengaging the clutch elements 49 and 56. In this position of the parts, rotation of the shaft 48, by means of the hand knob 60, will cause corresponding rotation of the gear 59, without rotating the shaft section 51. This provision is made for manual adjustments of the electrodes E as will be presently described.

As will be recalled, there is provided a worm unit 40, for each pair of electrodes, one of the latter being adjusted automatically by rotation of the worm 54, engaging the lower side of the worm 40, while the other electrode is automatically adjusted by means of a worm 61, engaging the worm 40, at a point substantially diametrically opposite the point where the worm 54 engages. This worm 61, is keyed to a shaft 51, corresponding to that already described, which projects through bearings 62 and 63, carried by the bracket 43, and between the legs of which is provided a clutch casing 50 corresponding to the one just previously described. This clutch, as on the opposite side of the frame, couples a shaft 48, with the drive shaft 51 for rotating gear 59. This shaft 48, is extended out on the opposite side of the machine to terminate in a hand knob 60, for declutching the drive shaft while manual adjustments are made to the electrode on that side of the machine.

The electrode holder brackets 44, are the same for both sides of the apparatus and a description of one will suffice for both. Each bracket is provided with a pair of outwardly extending bearings 64, for rotatably receiving an electrode holder sleeve 65. The upper end of this sleeve has keyed thereto a beveled gear adapted for constant mesh with its companion gear 59. This gear 66, rests upon an anti-friction bearing 67, supported upon the upper surface of the upper bearing 64. The lower end of each sleeve 65, has a bronze nut 68, brazed or otherwise secured thereto and is extended through the lower bearing 64. Within this nut is adapted to operate a tubular screw 69 extending through the sleeve 65. Within the tubular screw is rigidly mounted an electrode holding sheath 70, which is insulated from the inner surface of the tubular screw by means of an elongated sleeve 71 of insulating material.

In order to cause longitudinal movement of the tubular screw 69, upon rotation of the holder sleeve 65, the screw is provided with a pair of diametrically disposed longitudinally extending key-ways 72, for slidably receiving a pair of keys 73, anchored on a bearing bracket 74, floated on a lower bearing 64, by a shouldered screw 75. The electrode sheath 70, extends beyond the lower end of the screw 69 and through an insulated spacer bushing 76; and conductor head 77, where it is secured therein to make firm electrical contact by a pair of set screws 78. This conductor head is preferably of copper and has attached by means of a bolt 79, the end of one of the armored conductors 29, whereby to cause conduction of an electric current from one of the laminated conductors 27. As will be hereinafter explained, the electrodes E, are caused to be adjusted one way or the other during the operation of the device by the reversible motors M so as to maintain a proper gap between each pair of tungsten electrodes.

As more clearly shown in Figs. 3 and 8, control body 25, which is supported by the supports 22 and 23, suspends a welding head or electrode chamber W, by means of a plurality of depending hydrogen nozzles 80, in a position whereby the downwardly converging electrodes E—E may extend therethrough as shown. The welding head may assume any one of various forms, being in one piece as shown in Figs. 11 and 12, or made up of a plurality of sectional units as shown in Figs. 2, 18 and 19 and in either event is equipped with a combined hydrogen and electrode chamber 81, cooled by a medium in a jacket 82. Also, in either event, the welding head is provided with rotatable eccentric insulated bushings 83, through which the electrodes may slide and returned for adjustment. The normal operating position of the electrodes is such that their lower ends project approximately slightly below the welding head to strike a gap of the proper size therebetween. In such instances it may be found desirable to arrange a gap between the electrodes, closer to, or farther from, the chamber 81, wherein there is set up a uniform flow of hydrogen for maintaining the proper arcing condition as well as to provide a non-oxidizing atmosphere below the welding head and surrounding the edges to be welded. It is to be distinctly understood that in the preferred embodiment of my invention, the electrodes E are not of the type to be melted and deposited in the material of the weld and their operation is not dependent upon completing an electrical circuit through the work, so that the latter is not influenced in the least by the passage of electrical energy, such as occurs in the well known metallic arc welding apparatus. However, no welding strip is employed in this process or apparatus and consequently the metal of the work constitutes the only metal forming the weld.

The control body 25, whether made for a series of eight arcs, more or less, is preferably composed of a pair of castings having their point of union along a line extending longitudinally of the body and secured together by pairs of machine screws extending thereinto from opposite sides thereof as indicated in Fig. 2. Each half or section of the control body is provided with a longitudinally extending hydrogen passage, 85, and below the same is arranged a longitudinally extending passage 86 for water or other cooling medium. At one end of the control body is provided a pipe connection 87, extending to a common source of hydrogen and projecting from the same end of the body is a conduit 88, extending to a common source of cooling medium supply. When the control body is composed of a plurality of individual sections as shown in Fig. 2, these sections are all bolted securely together with suitable packing therebetween, by means of longitudinally extending bolts 87', whereby the passages 85 and 86, of the various units are in alignment and there is free flow of both hydrogen and cooling medium from the common sources throughout the entire series of units. These bolts extend on through to support 22, and serve to support the control body independently of the other supporting arm 23, as hereinbefore specified. The inner abutting faces of the sections of each control unit are provided with complementary semicircular cavities to form a circular seat when bolted together for the attachment of the hydrogen nozzles 80. Any suitable packing glands may be provided for the nozzles or they may be welded onto the control body to prevent leakage of hydrogen. Each of these nozzles 80, is tubular, the bore in the upper portion of each being enlarged and terminated at its upper end in an internally screw threaded portion for the reception of a packing nut 88, through which extends a rotatable stem 89, having the portion thereof below the packing 90, tubular in formation as at 91, to extend through a restricted passage 92, in the nozzle and to be provided with external threads 93, adjacent its lower end to be screw threaded into the lower end of the nozzle 80, which projects into the chamber 81. This threaded portion 93, is provided with a series of longitudinally extending grooves, to cause communication between the outer flared end 94, of the nozzle and that portion of the restricted bore between the nozzle and control stem 91. The lower end of the control stem 91, terminates in an enlarged head 95, of the type shown in Fig. 10, or as in Fig. 8, wherein the inner face of the head is provided with an annular groove 96, to form with the flared nozzle a reservoir so to speak for low pressure hydrogen and to cause an even and uniform flow of low pressure hydrogen out from the nozzle into the hydrogen chamber 81. Whichever type head of the control stem is provided, its bore is provided with a threaded portion for the attachment of inter-changeable high pressure hydrogen jets 97, it being proposed to provide a series of such jets having different size axial openings therethrough to more or less control the amount of high pressure hydrogen delivered to the gap between the electrodes.

In order to direct high and low pressure hydrogen respectively through the longitudinal passages 91 and 92, a pair of tubular spools 98, and 99 are snugly mounted in superimposed relationship with a gasket 100 arranged therebetween, in the tubular portion of the control stem 89. The two ends of each of these spools are enlarged to snugly fit within the enlarged bore of the nozzle 80, leaving a passage between each spool and the inner walls of the nozzle as shown. The inner diameter of the upper spool 98, inwardly of its two ends is enlarged and radial openings 101, penetrate the spool to cause communication between the inside and outside thereof. Such openings open out into an annular passage 102, which communicates with a passage 103, through the nozzle and into the control body whereby high pressure hydrogen will be admitted into the interior of the upper spool. The tubular portion of the control stem 89, within the upper spool is provided with apertures 103; whereby the high pressure hydrogen can enter and move axially through the control stem and out through the jet 97. The lower spool 99, also has its two ends enlarged to snugly fit the larger bore of the nozzle in order to constitute an annular low pressure passage 104, which communicates through a lateral passage 105, with a low pressure hydrogen passage 106. This lower spool is also equipped between its ends with radial apertures to effect communication between the chamber 104 and the passage 92 extending between the nozzle 80 and the tubular control stem 89. In this way low pressure hydrogen is fed into the portion 105, annular chamber 104 and thence into the space 92 to flow through the grooves 93 and out of the flared nozzle between the same and the enlarged head 95. The passage 103 communicates with the main hydrogen passage 85 and the amount of hydrogen passing into this passage 103 is controlled by a needle valve 107. Likewise a needle valve 108 controls the passage of the hydrogen from the passage 85 at the opposite side of the control member. By operating these two needle valves the hydrogen pressure is controlled for the high and low pressure hydrogen passages through the nozzle 80.

Both the control body 25 and the welding head W, are maintained at proper temperature by means of a cooling medium which enters the control body from a common source and passes through the water jackets 82 of the welding heads and thence to an outlet manifold. In the sectional type of control body and welding head shown in Figs. 2, 8 and 9, alternate units of the control body are tapped with pipes 109, communicating with longitudinal water passages on one side thereof with one side of the corresponding unit of the welding head so as to cause the cooling medium to flow through the pipe 109, in the direction of the arrows into the water jacket 82 of the welding unit and thence out through the opposite side through pipe 110 leading into an exhaust manifold 111. The cooling medium from the passage 86 at the opposite side of the head, passes through a tapped connection 112 into each alternate welding head unit, through its water jacket and out of the same through a pipe connection 113, see Fig. 3, across the top of the welding head and thence into the outlet pipe 110. In this manner the cooling medium will be transmitted to the individual welding heads at a uniform temperature and those at the far end of the head will be cooled just as efficiently as those at the end of the head nearest the source of supply.

The preferred type of welding head is shown in Fig. 17, in which the hydrogen chamber 81, is formed by the enlarged cup shaped ends 114 of a pair of spools or thimbles 115. The enlarged cylindrical ends of these two spools are cut at a bias as indicated at 116 to the axis line thereof so that when these two enlarged ends of the spools are placed together on the bias cuts they are disposed at the angle shown whereby the walls of the hydrogen chamber are disposed in downwardly converging relationship. These two cup shaped ends of the spools are united in any suitable manner but are preferably welded.

The upper reduced ends 117 of the spools are flanged as at 118, which flanges overlap the top surface of the welding head or unit W and are preferably welded thereto. Likewise, the lower edge of the enlarged ends are preferably welded as at 119 to the opening in the welding head unit. As a result, the shell of the welding head and spools constitute a cooling jacket indicated at 82. It is also well to note that the lower ends of the nozzles 80 which project into the welding head and hydrogen chamber 81, are also welded to these spools where they contact therewith as well as with the upper portions of the welding head as indicated at 120. Extending through the water jacket of each welding unit W, is a tubular liquid tight sleeve 121, which is adapted to align with corresponding sleeves of adjacent units and the openings in gaskets placed between the units for the passage of bolts or tie rods 122 which connect all of the units into a unitary structure.

It is to be particularly noted that the centers of the spools 117 through which the electrodes extend, are offset on opposite sides of the center of the jet 80. This causes the electrodes to be offset in the same manner and arranged in downwardly converging relationship and it is believed that this particular arrangement of the electrodes of each pair causes a crowding together of the magnetic fields around the electrodes, which in conjunction with the rarefied path provided by the stream of gas or hydrogen causes a substantially S shaped arc struck therebetween with its longitudinal component disposed parallel to and longitudinally of the edges to be united. Moreover, this arrangement tends to stabilize the arc and causes it to substantially touch and be aligned with adjacent arcs whereby a substantially continuous elongated arc is provided to parallel the seam to play directly down into the open seam between the members to be united. This control has been attempted to be illustrated in Figure 24 showing the touching of adjacent arcs or slight overlapping thereof whereby the individual arcs provide in effect, one elongated arc.

In Figs. 13 to 16 are shown other modifications of the hydrogen chambers surrounding the offset electrodes and Figs. 13 and 14 depict a form in which the entire welding head has one continuous cavity 122, extending lengthwise thereof to form an elongated hydrogen chamber. It will be noted that the outline of this elongated chamber is scalloped, so to speak, with opposed portions 123, along opposite margins of the cavity extending toward each other so as to define more or less individual chambers for the various pairs of electrodes. In other words, these opposed, inwardly extending walls of the cavity define more or less a dividing wall or partition which is insulated by the extension of the water jacket.

In order to more closely confine the low and high pressure hydrogen to its respective pairs of electrodes, Fig. 14 proposes an alternate construction in which a pair of deflected baffles 124, are arranged on opposite sides of each pair of electrodes and transversely of the welding head as shown. The end edges of these baffles are deflected or tapered to correspond with the taper of the lower side walls of the welding head and thereby snugly fit the same. If desired, these edges may be welded or attached to the inner surface of the hydrogen chamber in any way found most desirable. It will be noted that the medial portions of these deflectors 124, as designated by the numeral 125, are formed or bent inwardly to extend closer to the hydrogen jet and thereby equally distribute the hydrogen to its chamber on opposite sides of the hydrogen jet.

In Figs. 15 and 16, other modifications of the hydrogen chamber are disclosed and more closely follow the preferred modification shown in Figs. 17 and 20. Accordingly, these chambers are constituted by a pair of cup shaped sleeves having their centers concentric with the offset electrodes so that the two cups assume an oblique relationship with respect to the longitudinal center line of the welding head. The cup formations of Fig. 15 assume the form of hollow truncated cones having portions of their sides removed on a bias so that when they are united as shown, by welding or otherwise, the intermediate portion of the two cones is offset inwardly as at 126 to give the same effect of the portions 125 of deflectors 124. In the form of cup shown in Fig. 16, the cups 128 are substantially cylindrical and are united in a similar manner to the preceding modification.

As before mentioned, a supporting shoe S, may be mounted within the tubular stock to back up the open seam and prevent running or leakage of the metal into the tubing when it has been reduced to a molten state. This shoe is carried by one end of a tube 129, extending lengthwise of the tubing from a point at which the flat strip is rolled up into tubing, up to a point just in advance of the welding head. The outer end of this pipe or tube 129 is rigidly supported and has an operating rod 130, extending through the same to be connected as at 131 to a shoe 132. A coil spring, not shown, is adapted to surround the rod 130 and abut the end of the pipe 129 while a nut threaded on the outer extremity of the rod is designed to abut the other end of the coil spring so that when screwed home, normally tends to pull the shoe 132 in the direction of the arrow shown in Fig. 2. This shoe is provided with a plate 133, preferably made of copper alloy or it may be formed of carborundum or any other suitable material for maintaining proper temperature beneath the weld. The shoe 132, is provided with a passage 134 for a cooling medium and circulation is maintained by means of a conduit 135. The cooling medium may be maintained at a uniform temperature by any suitable thermostatic control. Furthermore, the shoe 132, has a plurality of pairs of links 136, pivotally connected to the sides thereof and the lower ends of these links are pivotally connected as at 137 to a carriage 138. This carriage is equipped with a plurality of pairs of rollers 139 having peripheries matching to the inner surface of the tubing so as to form a substantial support for the shoe without marring the interior of the tubing. When the shoe is drawn up tight against the inner side of the tubing the rollers also permit free passage of the tubing thereof in its travel through the machine. The outer end of this carriage is provided with an enlargement 140 which mounts a pair of rollers 141 on horizontal axes to engage with the interior of the tubing at diametrically opposed points directly on a line drawn through the center of the smoothing rolls 8. Needless to say, the peripheries of these two rollers 144, conform exactly to the inner periphery of the finished tubing and assist the rolls 8 in smoothing out the weld.

In order to protect the welding apparatus from the intense heat created by the multiple arcs, a heat insulating shield or guard G is interposed between the tubing being welded and the apparatus as best seen in Fig. 3. For supporting this heat shield, a pair of vertically spaced supporting bars 150 and 151 are secured to the end frame 22 and have their ends bent to parallel the control body 25 as shown. The heat insulating guard is made in two sections 152, secured to the lower supporting bar or frame 151 and upper sections 153 provided with vertically spaced upwardly opening clips or hooks 154 adapted to detachably clasp the upper and lower frame bars 150 and 151. Accordingly it will be obvious that the upper guard sections 153 can be removed by simply raising them sufficiently to disengage the clips 154 from the supporting bars, thereby giving ready access to the welding apparatus. Preferably the upper ends of the sections 153 are deflected outwardly as at 155 and are suitably reinforced at the angles thereof with angle cleats 156.

The lower section 152 of the guard is secured at each side of the apparatus to the lower supporting frame 151 by means of the screws 157. The lower ends 158 of these sections are bent inwardly to engage the welding head W as shown and if desired may be permanently attached thereto in any suitable manner. This sectional heat insulating guard is preferably formed of heat insulating material and the sides of the same are arranged in downwardly converging relationship as shown to conform with the general configuration of the apparatus.

While various means can be employed for automatically adjusting each pair of electrodes E, one manner of control is illustrated in the wiring diagram illustrated in Figs. 29 and 30. In these two diagrams like numerals are employed to designate like parts and the object of illustrating the wiring diagram in two different ways is to show more clearly in Fig. 30, the relationship of the various co-acting coils.

Referring to these diagrams, the one shown in Fig. 29 is illustrated as being connected to the welding apparatus shown in the lower right hand corner of the figure to make its application as clear as possible in view of the complicated relation and co-action between the various circuits. The electrodes E—E are shown receiving their current through the buss bars or conductors 27 mounted on the frame of the welding apparatus. The right hand electrode E is connected by lead 204 to one side of ammeter 250, the other side being connected with a power contactor 252 which is also connected by a main lead 204' to one of the windings of a transformer 253. This transformer is of the multiple coil type having a pair of primaries and a pair of secondaries.

For the purpose of clearness, the various lead wires on the circuits are marked with numerals corresponding to the binding posts or contacts to which they lead. The other electrode E is connected by lead 232 to a variable resistance group 254, having a set of plug-ins as shown. This variable resistance group leads through conductor 255 to a voltage control switch 256 which in turn is connected through the power contactor 252 to one end of a variable reactor coil 257. This same end of the coil is connected to the main power line while its opposite end is connected to a lead 258 which leads to contact 215 of a start and stop switch 259. A lead 260 is tapped into the lead 258 and is connected with a control contactor 261, which in turn is connected to a pair of contacts 214 of the switch 259. A solenoid valve 262 or a coil M is connected to the contact 215 of the control contactor and to a lead 224' which connects one end of the variable reactor coil 257 and the contacts 224 of a raising and lowering manually controlled switch 263. The side of the variable resistance group 254, opposite the switch 256, is connected by a lead 232 to a contact 232 which is connected to one end of a coil K which is influenced by the variable reactor coil 257. The other end of this coil at 203 has a lead 264, connected with the variable resistance group 254 and also with the lead connected to power contactor 252 and with the movable member of the switch 256. Another lead extends from this end of the coil K to the fulcrum of a voltage control relay and this same fulcrum is connected by a lead to post 203 of a contactor 265 adapted to lower the electrodes. The other post 220 of this contactor, leads to post 220 of the raising and lowering switch 263 and also to one field coil 266 of a series motor M. This field coil is connected with a second coil 267, which has a lead connected with contact 219 of the raising and lowering switch and also contact 219 of a contactor 268 for raising the electrodes and causing a greater gap therebetween. This contactor 268 possesses a coil having one contact 201 thereof, connected with a corresponding contact 201 of the voltage control relay. The other end of this coil is connected by a lead extending to one contact 218 of the control contactor 261. This lead is also connected with a 100 ohm resistance 269, the other end of which is connected to contact 216 of the contactor. A lead is connected with this side of the resistance and runs to the armature shaft of the motor M. Also connected to the armature winding, is a lead 251 which extends to one end of a second 100 ohm resistance 270; the other end thereof being connected to the resistance 269 as well as to contact 218 of the switch 259. The contactor 261 has its contact 218 connected by a lead to the contact 218 of the raising contactor 268. The contact 203 of this contactor is connected with a corresponding contact 203 of contactor 265 which as stated previously, leads to the fulcrum of the voltage control relay. This relay has one end of its winding connected to the lead 204 of the electrode as well as to one end of a coil of a protective relay 272. The other end of this coil is connected to the end 232 of the coil K which controls the control contactor 261. This end of the coil is also connected through a 450 ohm rheostat to one end of a 200 ohm resistance 273. This end of the resistance is also extended to a contact 221 of the protective relay, the other contact thereof being shown as 222 and leading to a wire 274 which connects the resistance 273 to a 110 ohm resistance 275. The other end of this resistance 275 is connected by a lead extending to one end of the coil of the control relay. With this wiring diagram, the gap or arc between the two electrodes E—E is automatically adjusted according to conditions existing in the electrode circuit and through the provision of the contactors 265 and 268 the electrodes are automatically raised and lowered. The raising and lowering of these electrodes can also be obtained by manipulation of the manual raising and lowering switch 263.

Figure 32:
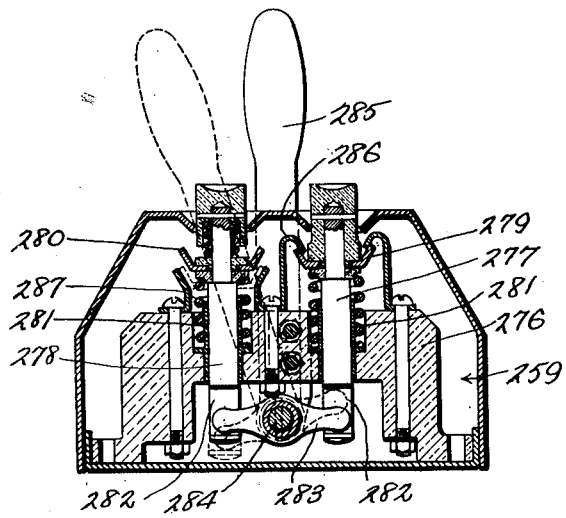
Figure 32 is a transverse section through the same.

The detailed construction of the start and stop switch 259 is shown in Figs. 31 and 32 and is of such construction that all of the motors M for controlling the electrodes, may be simultaneously started and stopped or any individual one or more of the motors can be controlled independently of the others. In this switch, the switch body is designated by the numeral 276 in the form of a bridge piece through which contact rods 277 and 278 are reciprocable and carry contacts 279 and 280 respectively. The switch is shown in open condition in full lines and closed condition by the dotted lines. The contact rods 277 and 278 are slidably mounted in bushings 281 and their lower ends are provided with elongated vertical slots 282 for the reception of a double ended cam lever 283 fixed to a common operating shaft 284 to one end of which is attached an operating handle 285. A common contact post 286 is provided for each pair of contacts 279 and 280. Expansion springs 287 surround the bushings 281 and normally urge contacts 280 out of engagement with the contact 286, while they normally urge contacts 279 into engagement with this post. When the operating handle 285 is moved into the dotted line position, it moves contact rod 278 downwardly to cause engagement of contact 280 with a common contact 286 to close the circuits thru the switch for simultaneously closing all circuits to all of the motors. Should it be desired to throw out any one or more of the motors, the button or buttons of the contacts leading to said motor or motors is depressed, causing disengagement of contact 279 from the contact post 286.

By reason of the slots 282 on both contact rods, each rod, by depressing its respective button can be moved independently of its co-acting contact rod for moving any of the contacts 280 into contact with the common contact post 286 for completing the circuit leading to its respective motor without first moving the operating handle 285. Consequently, individual or simultaneous control of the motors is possible.

To recapitulate and amplify the mode of operation of the welding apparatus, it will be well to note that as the tubing with its open seam passes beneath the welding head W, the temperature of the edges of the tubing is gradually increased and such temperature spreads gradually farther from the open seam the farther the tubing travels under the head. As it moves under an increasing number of arcs, the edges of the open seam are melted down, such melting continuing down throughout the thickness of the tubing as the latter moves under a larger number of the arcs until near the end of the battery of arcs, the metal of the tubing adjacent the seam has been melted to a molten state and forms a molten pool of metal which runs together and unites the two edges of the seam. This all occurs in a nonoxidizing atmosphere which causes the metal which has been melted to be actually purer than the parent stock of the tubing. It is believed desirable to cause one or more arcs at the far end of the battery to be arranged slightly farther away from the tubing in order to give the gases in the molten pool an opportunity to act and escape from the weld. Due to the intensity of the heating zone formed by the multiplicity of arcs, it is even possible to weld all grades of ferrous as well as non-ferrous metals which make the process and apparatus extremely desirable from the standpoint of welding alloy steels. Contributing to the superior results obtained from this apparatus is believed to be the maintenance of the support S at a comparatively uniform proper temperature which as stated hereinbefore, may be obtained by thermostatically controlling the flow of cooling medium through the shoe 132. Instead of adjusting the arcs at the far end of the battery, it may be found desirable to tilt the entire welding head so that the electrodes are arranged at progressively different distances from the tubing throughout the length of the battery of arcs. While the invention has been illustrated in connection with electric arcs, it is to be understood that the invention is not limited thereto and that various forms of heat producing means may be employed.

It is to be understood that various changes in the arrangement and construction of the parts may be resorted to without departing from the spirit of the invention or the scope of the appended claims.

I claim:

1. A welding unit comprising a body, a plurality of closely associated gas fed arc producing means associated therewith in tandem and an isolated conduit extending longitudinally through said body for supplying gas to the plurality of arc producing means, and a means for individually controlling the supply of gas to each arc producing means.

2. A welding unit comprising a body, a plurality of closely associated gas fed arc producing means associated therewith in tandem and isolated gas conduits extending through said body and insulated by adjacent coolant chambers for supplying high and low pressure gas to the plurality of arc producing means.

3. A welding unit comprising a body, a plurality of closely associated gas fed arc producing means associated therewith in tandem, said body having a main gas passage common to all of the arc producing means and cooled by adjacent coolant passage, an individual duct communicating said main passage with each arc producing means, and control means associated with each duct to regulate the flow of gas therethrough.

4. A welding unit comprising a body, arc producing means including electrodes, said body having a gas feeding passage, a conduit mounted in said passage and spaced from the walls thereof to form inner and outer gas passages, said conduit having an opening communicating with the inner and outer passages, means dividing the outer passage into separate channels, and gas feeding ducts connecting with outer passage on opposite sides of said dividing means.

5. A welding unit comprising an elongated insulated head, a plurality of pairs of electrodes extending therethrough, an elongated gas control body above said head, a plurality of gas conduits depending from said body and connected to said head in proximity to the pairs of electrodes, coolant chambers in said body adjacent the gas conduits and individual control means for each conduit.

6. A welding unit comprising a head, having a pair of substantially symmetrical communicating cavities, an electrode arranged axially of each cavity, and a source of fluid medium disposed substantially at the point of communication of said cavities.

7. A multiple unit welding apparatus comprising a series of juxtaposed electrode supports, an electrode adjustably associated with each support, a prime mover for each support operatively associated with said electrodes for adjusting same, and alternate prime movers being offset from the line of other prime movers and having their power shafts extended between adjacent prime movers.

8. A welding apparatus comprising a welding head composed of a plurality of individual sections coupled together, a control body including a plurality of individual sections coupled together and complementary to those of the head, a conduit connecting each pair of complementary sections, and a conduit connecting adjacent sections of said welding head.

9. A welding apparatus comprising a welding head composed of a plurality of individual sections coupled together, a control body including a plurality of individual sections coupled together and complementary to those of the head, a gas conduit connecting each pair of complementary sections, common cooling medium and gas passages extending through said sections of the control body, and a cooling medium conduit from each welding head section to an adjacent section of the control body.

10. A device for tube welding comprising a body adapted to be positioned within the tubing, a support, links each having one end pivotally connected to the support and its other end pivotally connected to said body, means for swinging said links to move said support relative to said body, and means for yieldingly retaining said support in expanded position while permitting free movement of the tubing over the support.

11. A welding apparatus comprising a welding head, a support therefor, electrode holders carried by the support and including a nut, a tubular threaded sleeve operating in said nut and provided with a longitudinally extended keyway, means for rotating said sleeve, an electrode mounted in said sleeve and movable therewith, and means carried by the support operating in said keyway for compelling longitudinal movement of the sleeve upon rotation of said holder.

12. A welding apparatus comprising a frame, a support carried thereby, electrodes mounted upon opposite sides of said support, means carried upon the support for operating the electrodes, said support including a pair of spaced end frames, and a welding head mounted between the end frames and the electrodes on opposite sides of the support, said electrodes extending into said welding head.

13. A welding apparatus comprising a frame, a support carried thereby, electrodes mounted upon opposite sides of said support, means carried upon the support for operating the electrodes, said support including a pair of spaced end frames, and a welding head mounted between the end frames and the electrodes on opposite sides of the support, said electrodes extending into said welding head, and one of said end frames including a relatively movable section engaging and supporting the welding head.

14. A welding apparatus comprising supporting frames, a gas conducting control body supported by said means, a welding head suspended from said body, coolant passages through said body and head, and conduits communicating with said passages.

15. A welding apparatus comprising supporting means, a control body mounted on said supporting means, gas conducting nozzles depending from the body, a welding head supported by said nozzles and having a cavity, electrodes extending into said cavity, and said nozzles being adapted to supply gas to the cavity in proximity to the electrodes.

16. A welding apparatus comprising a control body, a nozzle depending therefrom and having a pair of longitudinal passages therethrough, a welding head suspended by said nozzle and having a chamber, the lower end of said nozzle extending into said chamber and provided with an axial orifice communicating with one of said passages, and a concentric annular channel communicating with the other longitudinal passage, and electrodes extending into said chamber on opposite sides of said nozzle.

17. A welding apparatus comprising a body, a nozzle depending therefrom and having a longitudinal bore, a welding head supported on the lower end of said nozzle and having a chamber into which said nozzle extends, a tubular stem adjustable longitudinally in said bore and equipped with means cooperating with the end of the nozzle to vary the size of one of said longitudinal passages, said stem dividing said bore into a pair of longitudinal passages for the conduct of gas, and a pair of electrodes extending into said chamber on opposite sides of said nozzles.

18. A welding apparatus comprising a frame having downwardly converging sides and end members depending below the latter, a control body supported by said end members, a welding head suspended from said body, electrode holders mounted on the converging sides of said frame, electrodes adjustably mounted in said holders and extending in converging relationship into said welding head, a shaft extending longitudinally of the frame, and means engageable with opposite sides of said shaft and operatively connected with said electrodes for adjusting the same.

19. A welding apparatus comprising a frame having downwardly converging sides and end members depending below the latter, a control body supported by said end members, a welding head suspended from said body, electrode holders mounted on the converging sides of said frames, electrodes adjustably mounted in said holders and extending in converging relationship into said welding head, a shaft extending longitudinally of the frame, an individually rotated worm for each pair of electrodes on said shaft, a motor for rotating each worm, said motors being mounted upon said frame in staggered relationship, gear means engageable with opposite sides of each worm and operatively connected with each pair of electrodes for adjusting the same.

20. A welding apparatus comprising a frame having downwardly converging sides and end members depending below the latter, a control body supported by said end members, a welding head suspended from said body, electrode holders mounted on the converging sides of said frames, electrodes adjustably mounted in said holders and extending in converging relationship into said welding head, a shaft extending longitudinally of the frame, an individually rotated worm for each pair of electrodes on said shaft, a motor for rotating each worm, said motors being mounted upon said frame in staggered relationship, gear means engageable with opposite sides of each worm and operatively connected with each pair of electrodes for adjusting the same, and clutch means associated with the gear means for selectively disengaging the latter from the motor driven worm for individual manual adjustment of the individual pairs of electrodes.

21. A welding apparatus comprising a welding head, a supporting frame therefore, a rotatable electrode holder carried by the frame, a gear keyed to said holder, a sectional shaft mounted on said frame and including relatively movable sections having a clutch connection normally engaged, one section of the shaft being longitudinally movable, a gear splined on said section and permitting longitudinal movement of said shaft section to disengage the clutch while maintaining meshing engagement with the first mentioned gear.

22. A welding apparatus comprising a welding head, a support therefore, an electrode holder rotatably mounted on the support and including a nut, a tubular threaded sleeve operating in said nut and provided with a longitudinal keyway, means for rotating said holder, an electrode mounted in said sleeve to move therewith, and a loosely mounted key operating in said keyway for compelling longitudinal movement of the sleeve upon rotation of said holder.

23. In a welding apparatus, a supprting frame, a plurality of substantially vertical electrode holders arranged side by side, alternate holders projecting above the others, a drive shaft for each holder, said drive shafts being mounted upon said frame in staggered relationship, a separate motor for each shaft arranged above the same, and said motors being staggered whereby the drive shafts of alternate motors project between the adjacent motors.

24. A welding unit comprising a head having a pair of substantially circular communicating cavities of substantially the same size, an electrode arranged axially of each cavity, and means for supplying gas at the point of communication of said cavities, thereby causing a substantially equal amount of gas to be distributed to each electrode.

25. A welding unit comprising a head having a pair of substantially circular communicating cavities having their axis intersecting in a vertical plane which separates the two cavities, an electrode arranged axially of each cavity, and means for supplying gas at the point of communication of said cavities.

26. A welding unit comprising a body having a series of pairs of electrodes, each pair of electrodes being arranged in convergent positions relative to a line of convergence with their arcing terminals laterally displaced with respect to each other in the direction of said line of convergence, means for projecting hydrogen gas through the arc created between each pair of electrodes to create zones of atomic hydrogen, each pair of electrodes being arranged in planes oblique to a line extending lengthwise of the series whereby the arcs of all of said pairs and said zones of atomic hydrogen are caused to extend substantially lengthwise of said line, said pairs of electrodes being arranged so closely together that the individual zones of atomic hydrogen merge into one another to establish a substantially continuous and elongated welding zone of atomic hydrogen, extending lengthwise of said line of convergence.

27. Means for feeding an electrode to electric arc welding equipment comprising a threaded sleeve having standard continuously spiral threading, an electrode housed therein for movement therewith, a nut through which the sleeve is threaded for movement, means for producing relative rotation between the nut and sleeve, and means for causing the longitudinal movement of the sleeve and electrode, and responsive to a characteristic of the welding arc for controlling relative rotation of said nut and sleeve.

28. Means for feeding an electrode to electric arc welding equipment comprising a support, a rotatable sleeve, a nut carried thereby and having standard continuously spiral threading, a threaded sleeve positioned in the rotatable sleeve and threadedly engaging said nut, an electrode having the major portion of its length housed in the threaded sleeve for longitudinal movement therewith, a key between said threaded sleeve and support, and means responsive to a characteristic of the welding arc for controlling rotation of said rotatable sleeve to cause longitudinal movement of the threaded sleeve and electrode upon rotation of said nut.

29. Means for feeding an electrode to electric arc welding equipment comprising a support, a rotatable sleeve, a nut carried thereby, a threaded sleeve positioned in the rotatable sleeve and threadedly engaging said nut, an electrode housed in the threaded sleeve and insulated therefrom and adapted to move with the sleeve, and key means between said threaded sleeve and support for causing longitudinal movement of the threaded sleeve and electrode upon rotation of said nut, and means responsive to a characteristic of the welding arc for controlling rotation of said rotatable sleeve.

30. A welding unit comprising in combination a body having a series of pairs of electrodes, each pair of electrodes being arranged in convergent positions relative to a line of convergence with their arcing terminals laterally displaced with respect to each other in the direction of said line of convergence, means for projecting gas containing hydrogen at a low velocity through the arc created between each pair of electrodes to create elongated sector shaped zones of atomic hydrogen, each electrode of each pair of electrodes lying in a plane oblique to said line of convergence whereby said zones of atomic hydrogen are caused to extend substantially lengthwise of said line of convergence, said pairs of electrodes being arranged so closely together that the individual fan shaped zones of atomic hydrogen substantially merge into one another to establish a continuous elongated welding zone of atomic hydrogen extending lengthwise of said line of convergence.

31. A welding unit comprising in combination, a body having a series of closely juxtaposed pairs of electrodes, each pair of electrodes being arranged into convergent positions relative to a line of convergence with their arcing terminals laterally displaced with respect to each other in the direction of said line of convergence, each electrode of each pair of electrodes lying in parallel planes oblique to said line of convergence, and means for projecting gas containing hydrogen at a low velocity through the arc created between each pair of electrodes to create elongated sector shaped zones of atomic hydrogen.

32. Means for feeding an electrode to electric arc welding equipment comprising an elongated rotatable sleeve having an interior thread, an elongated exteriorly threaded electrode sleeve extending within the rotatable sleeve and engaging the thread thereof, an electrode having the major portion of its length housed and protected within the electrode sleeve and being movable therewith, and means normally preventing rotation of the electrode sleeve to compel its longitudinal feeding movement with the electrode upon rotation of the rotatable sleeve.

ERNEST RIEMENSCHNEIDER.